United States Patent
Ushiwata et al.

(10) Patent No.: US 8,561,513 B2
(45) Date of Patent: *Oct. 22, 2013

(54) MITER SAW

(75) Inventors: Shigeharu Ushiwata, Hitachinaka (JP); Ryuichi Imamura, Hitachinaka (JP); Hideaki Terashima, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/207,730

(22) Filed: Aug. 11, 2011

(65) Prior Publication Data

US 2011/0290092 A1 Dec. 1, 2011

Related U.S. Application Data

(63) Continuation of application No. 11/217,300, filed on Sep. 2, 2005, now Pat. No. 7,997,177.

(30) Foreign Application Priority Data

Sep. 2, 2004 (JP) ................. P2004-255494
Sep. 2, 2004 (JP) ................. P2004-255599

(51) Int. Cl.
*B23D 45/04* (2006.01)
*B23D 47/02* (2006.01)

(52) U.S. Cl.
USPC .............. 83/473; 83/471.2; 83/477.1; 83/581

(58) Field of Classification Search
USPC ............. 83/473, 471.3, 485, 490, 581, 477.2, 83/477.1, 167, 486.1, 486–489, 471.2
See application file for complete search history.

(56) References Cited

U.S. PATENT DOCUMENTS

| | | | |
|---|---|---|---|
| 1,852,387 A | 4/1932 | Wieden | |
| 3,302,669 A | 2/1967 | Adolph | |
| 4,036,093 A | 7/1977 | Thorsell | |
| D287,694 S | * 1/1987 | Miyamoto | .................... D15/133 |

(Continued)

FOREIGN PATENT DOCUMENTS

| | | |
|---|---|---|
| CA | 2 372 451 A1 | 8/2003 |
| DE | 20 2004 004 929 | 6/2004 |

(Continued)

OTHER PUBLICATIONS

Japanese Office Action dated Mar. 2, 2010 for Application No. 2004-255599.

(Continued)

*Primary Examiner* — Ghassem Alie

(74) *Attorney, Agent, or Firm* — Antonelli, Terry, Stout & Kraus, LLP.

(57) ABSTRACT

A miter saw for cutting a workpiece is disclosed. The miter saw has a base section, a holder section, a saw blade section, a saw blade support section, and a guide bar. The base section has an upper surface for supporting a workpiece to be cut. The holder section stands from the base portion. The saw blade section has a circular saw blade for cutting the workpiece. The saw blade support section pivotably supports the saw blade section. The guide bar slidably supports the saw blade support section. The guide bar is slidably supported by the holder section. The guide bar extends substantially parallel to the upper surface of the base section. The saw blade support portion is slidable along the guide bar.

16 Claims, 9 Drawing Sheets

(56) References Cited

U.S. PATENT DOCUMENTS

| | | | |
|---|---|---|---|
| D306,031 S * | 2/1990 | Ushiwata et al. | D15/133 |
| 5,060,548 A | 10/1991 | Sato et al. | |
| 5,129,738 A | 7/1992 | Nakagawa | |
| 2,241,888 A | 9/1993 | Chen | |
| 5,241,888 A | 9/1993 | Chen | |
| D374,803 S * | 10/1996 | Terpstra et al. | D8/66 |
| D389,494 S * | 1/1998 | Chen | D15/133 |
| 5,819,624 A | 10/1998 | Brault et al. | |
| 5,862,732 A | 1/1999 | Itzov | |
| 5,907,987 A | 6/1999 | Stumpf et al. | |
| 5,937,720 A | 8/1999 | Itzov | |
| 6,016,732 A | 1/2000 | Brault et al. | |
| D424,072 S * | 5/2000 | Shibata et al. | D15/133 |
| 6,561,068 B2 * | 5/2003 | Meredith et al. | 83/471.3 |
| D487,754 S * | 3/2004 | Kao | D15/133 |
| 6,918,330 B2 | 7/2005 | Ng et al. | |
| 6,997,091 B1 | 2/2006 | Shibata | |
| D529,936 S * | 10/2006 | Taniguchi et al. | D15/133 |
| D567,831 S * | 4/2008 | Wikle et al. | D15/133 |
| 7,997,177 B2 * | 8/2011 | Ushiwata et al. | 83/473 |
| 2002/0144582 A1 | 10/2002 | He | |
| 2003/0056632 A1 * | 3/2003 | Ng et al. | 83/581 |
| 2005/0066788 A1 * | 3/2005 | Chang | 83/490 |
| 2005/0098010 A1 | 5/2005 | Hu | |
| 2005/0217449 A1 * | 10/2005 | Ng et al. | 83/581 |

FOREIGN PATENT DOCUMENTS

| | | |
|---|---|---|
| EP | 1 510 307 | 3/2005 |
| JP | S47-025751 | 8/1972 |
| JP | 62-11526 | 1/1987 |
| JP | S62-041503 | 3/1987 |
| JP | 62-200401 | 12/1987 |
| JP | H07-047502 | 2/1995 |
| JP | H09-117821 | 5/1997 |
| JP | H09-117822 | 5/1997 |
| JP | H09-164504 | 6/1997 |
| JP | H11-034001 | 2/1999 |
| JP | H11-170202 | 6/1999 |
| JP | H11-198101 | 7/1999 |
| JP | 2003-245901 | 9/2003 |

OTHER PUBLICATIONS

Decision of Rejection dated Oct. 26, 2010 for Application No. 2004-255599.

Japanese Office Action dated Apr. 12, 2011 for Japanese Patent Application No. 2004-255599.

Japanese Office Action dated Apr. 11, 2013 for Application No. 2012-110143.

Japanese Office Action dated May 9, 2013 for Application No. 2012-110143.

* cited by examiner

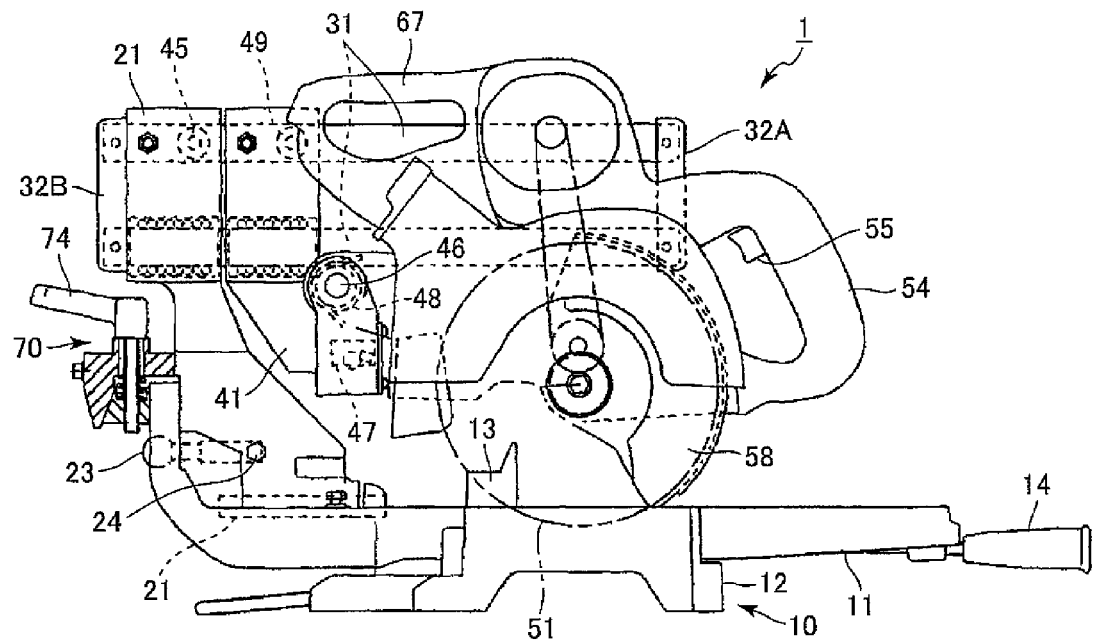

MITER SAW

CROSS REFERENCE TO RELATED APPLICATION

This application is a continuation application of Ser. No. 11/217,300, filed Sep. 2, 2005, now U.S. Pat. No. 7,997,177 issued Aug. 16, 2011, the disclosure of which is hereby incorporated by reference.

BACKGROUND OF THE INVENTION

1. Technical Field

The present invention relates to a miter saw having a circular saw blade section which is vertically pivotable with respect to a base section and movable in a horizontal direction.

2. Related Art

Japanese Utility Model Unexamined Publications SHO 62-11526 and SHO 62-200401 disclose a miter saw including a base section for mounting a workpiece thereon, a holder standing from the base section, a circular saw blade section having a motor and a circular saw driven by the motor, and a support section for pivotably support the circular saw blade section in a vertical direction. The holder supports a guide bar slidably in a horizontal direction with a front end of the guide bar being attached to the support section. The miter saw cuts the workpiece with circular saw blade, while moving the support section together with the guide bar with respect to the base section.

The circular saw blade section further has a transfer handle used by a user for carrying the miter saw. The user can carry the miter saw by gripping the transfer handle.

However, in the conventional miter saw described above, the guide bar generally protrudes backward from the holder to a large extent. The problem arises that workability of cutting a workpiece by the above miter saw is not good if a wall or an obstacle exists behind the holder.

Generally, the transfer handle is provided at the position deviated from the center of the miter saw in its width direction. Therefore, the weight balance of the miter saw is not so good nor stable when carrying the miter saw. This is inconvenient for the user to carry the miter saw.

SUMMARY OF THE INVENTION

A main object of the present invention is to overcome the above-described problem and to provide a miter saw which cuts a workpiece even in a small space.

Another object of the present invention is to provide a miter saw which improves the workability when a sufficient working space is allocated.

Further object of the present invention is to provide a miter saw which can maintain a proper weight balance during its transfer.

The present invention provides a miter saw having a base section, a holder section, a saw blade section, a saw blade support section, and a guide bar. The base section has an upper surface for supporting a workpiece to be cut. The holder section stands from the base portion. The saw blade section includes a circular saw blade for cutting the workpiece. The saw blade support section pivotably supports the saw blade section. The guide bar slidably supports the saw blade support section. The guide bar is slidably supported by the holder section. The guide bar extends substantially parallel to the upper surface of the base section. The saw blade support portion is slidable along the guide bar.

The present invention provides a miter saw having a base section, a holder section, a saw blade section, a saw blade support, a guide bar, and a handle. The base section has an upper surface for supporting a workpiece to be cut. The holder section stands from the base portion. The saw blade section includes a circular saw blade for cutting the workpiece. The a saw blade support section pivotably supports the saw blade section. The guide bar slidably supports the saw blade support section. The guide bar is supported by the holder section. The guide bar extends substantially parallel to the upper surface of the base section. The saw blade support portion is slidable along the guide bar. The handle is used for carrying the miter saw. The circular saw blade has a rotation shaft and a side surface. The miter saw has a width extending in a parallel direction to the rotation shaft and a length extending in a parallel direction to the side surface. The circular saw blade is positioned in a position in proximity to a center of the width. The guide bar is deviated from the side surface by a predetermined distance. The handle is positioned between the circular saw blade and the guide bar in a width direction.

BRIEF DESCRIPTION OF THE DRAWINGS

The aforementioned aspects and other features of the invention are explained in the following description, taken in connection with the accompanying drawing figures wherein:

FIG. 15 is a side view of the miter saw, and showing a state where the holder contacts both of a back end cap of the guide bar section and the support segment;

FIG. 16 is a side view of the miter saw, and showing a state where the holder contacts a back end cap of the guide bar section and the support segment contacts a front end cap of the guide bar section;

DETAILED DESCRIPTION OF THE PREFERRED EMBODIMENTS

A miter saw having a mechanism according to the present invention will be described with reference to accompany drawings. Unless otherwise noted, orientation terms, such as left, right, front, rear, up, and down, are used with respect to the normal orientation of the miter saw for normal use.

Figure 1:
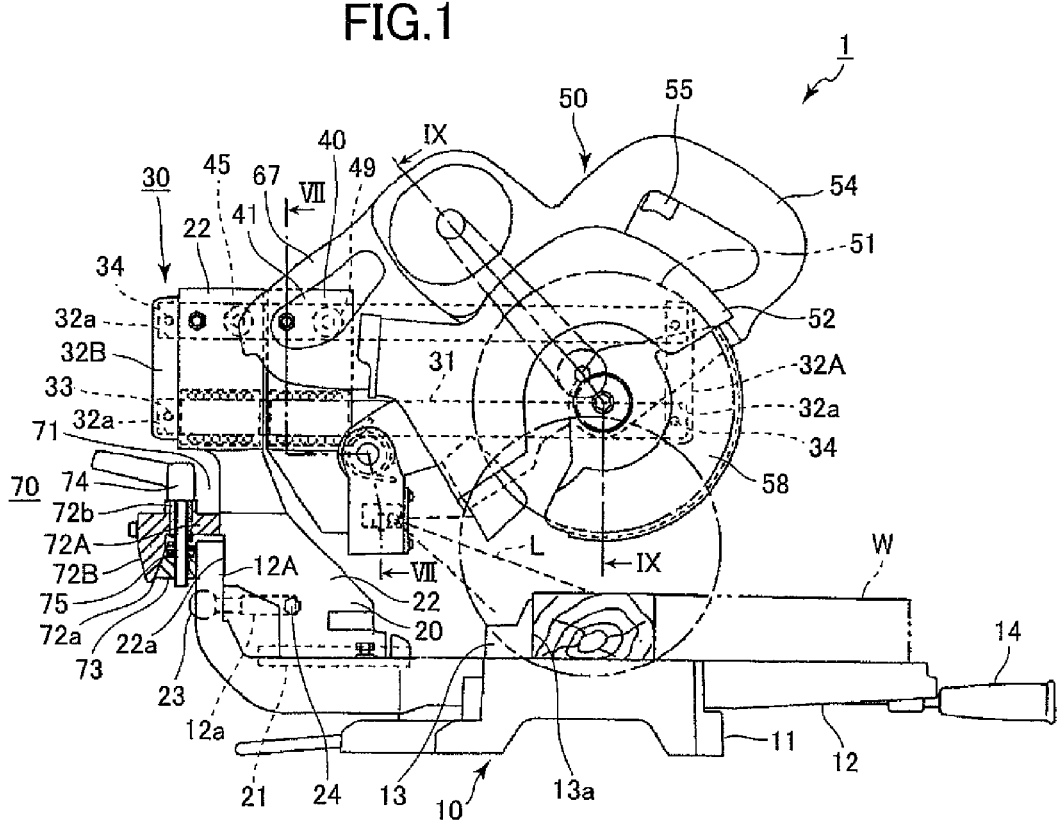
FIG. 1 is a side view of a miter saw according to a first embodiment of the present invention, and showing a state where the circular saw blade section is positioned at its rearmost and its uppermost position.
Figure 6:
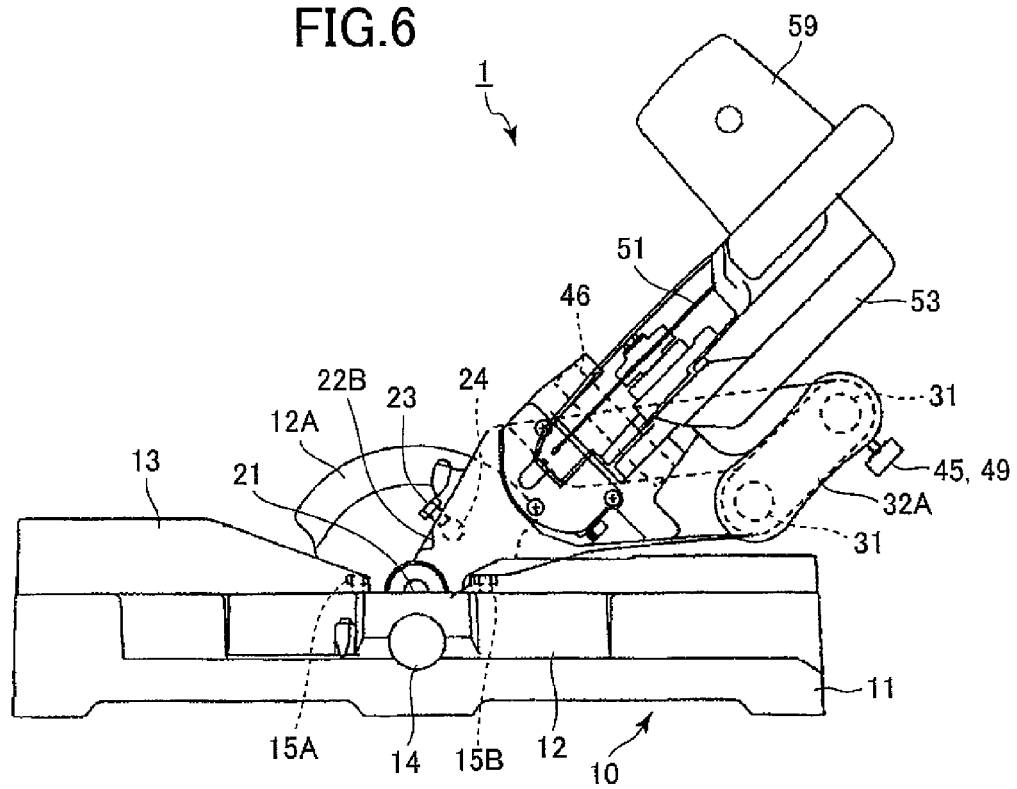
FIG. 6 is a front view of the miter saw and particularly showing a rightward tilting state of the guide bar support section and the saw blade section.
Figure 7:
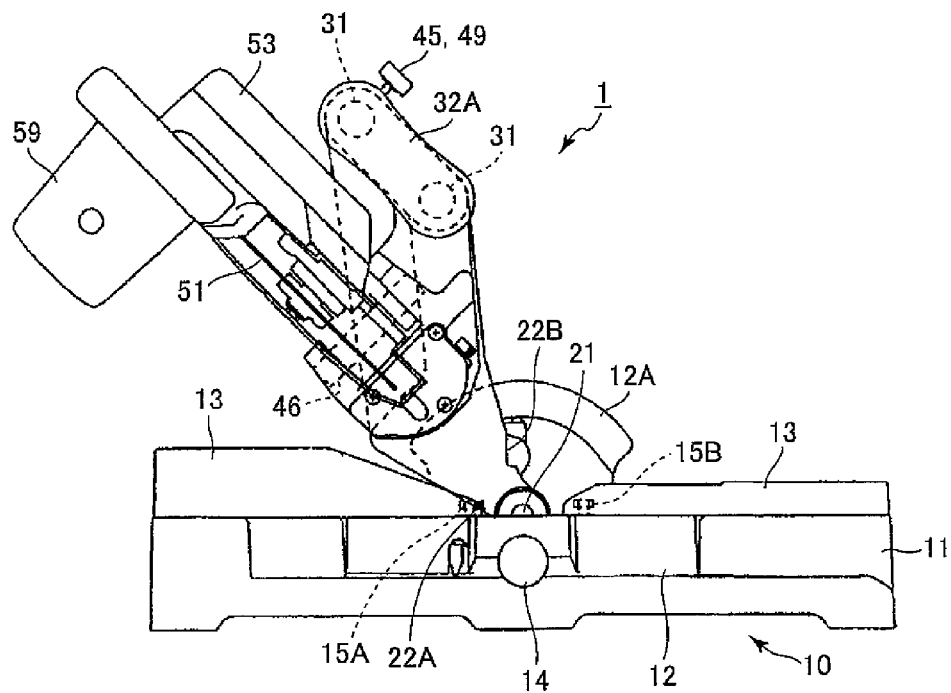
FIG. 7 is a front view of the miter saw and particularly showing a leftward tilting state of the guide bar support section and the saw blade section.

Referring to FIG. 1, a miter saw 1 generally includes a base section 10, a guide bar support section 20, a guide bar section 30, a saw blade support section 40, and a saw blade section 50. The base section 10 is adapted for mounting thereon a workpiece W to be cut. The guide bar support section 20 extends upwardly from the base section and is pivotally supported to the base section 10 and tiltable laterally as shown in FIGS. 6 and 7. The guide bar section 30 is supported to the guide bar support section 20 and extends in a horizontal and frontward/rearward direction. In the depicted embodiment, the guide bar section 30 is slidable with respect to the guide bar support section 20. The saw blade support section 40 is supported on the guide bar section 30 and movable between its rearmost position shown in FIG. 1 and a frontmost position shown in FIG. 3. The saw blade section 50 is pivotally supported to the saw blade support section 40 and movable between its uppermost pivot position shown in FIG. 1 and its lowermost pivot position shown in FIG. 3.

The base section 10 includes a base 11 to be mounted on a floor or a table, and a turntable 12 rotatable on the base 11 in a horizontal plane. An upper surface of the turntable 12 is flush with an upper surface of the base 11. The workpiece W such as a wood is mounted on the base 11 and the turntable 12. A pair of fences 13 extends in line in a lateral direction (rightward/leftward direction) and protrudes from the upper surface of the base 11 for positioning the workpiece W by abutting a vertical surface of the workpiece W with vertical abutment surfaces 13a of the fences 13. The turntable 12 has a rearmost upstanding portion 12A. A knob 14 is disposed at the front side of the turntable 12 for angularly rotating the turntable 12 about its axis and for fixing the angular rotational position of the turntable 12 relative to the base 11. At a rear portion of the turntable 12 and near the rearmost upstanding portion 12A, a through-hole 12a extending in frontward/rearward direction is formed.

The guide bar support section 20 is pivotally movably supported to a rear end portion of the turntable 12. Therefore, by the rotation of the turntable 12 relative to the base 11, positions of the guide bar support section 20, the guide bar section 30, the saw blade support section 40 and the saw blade section 50 relative to the fences 13 is changed. Thus, an angle between the abutment surface 13a and a circular side surface of the circular saw blade 51 is changed. Accordingly, the workpiece W can be cut at a desired angle relative to the frontward/rearward direction (angled cutting).

The guide bar support section 20 generally includes a holder shaft 21, a holder 22, and a holder fixing mechanism 70. The holder shaft 21 extends in the frontward/rearward direction at a rear side of the turntable 12. The holder shaft 21 has an axis positioned substantially coincident with the upper surface of the turntable 12. The holder 22 has a lower end portion pivotally movably supported on the holder shaft 21. Therefore, the holder 22 is laterally movable with respect to the turntable 12 about the holder shaft 21. The holder 22 has an upper portion to which the guide bar section 30 is attached.

Figure 4:
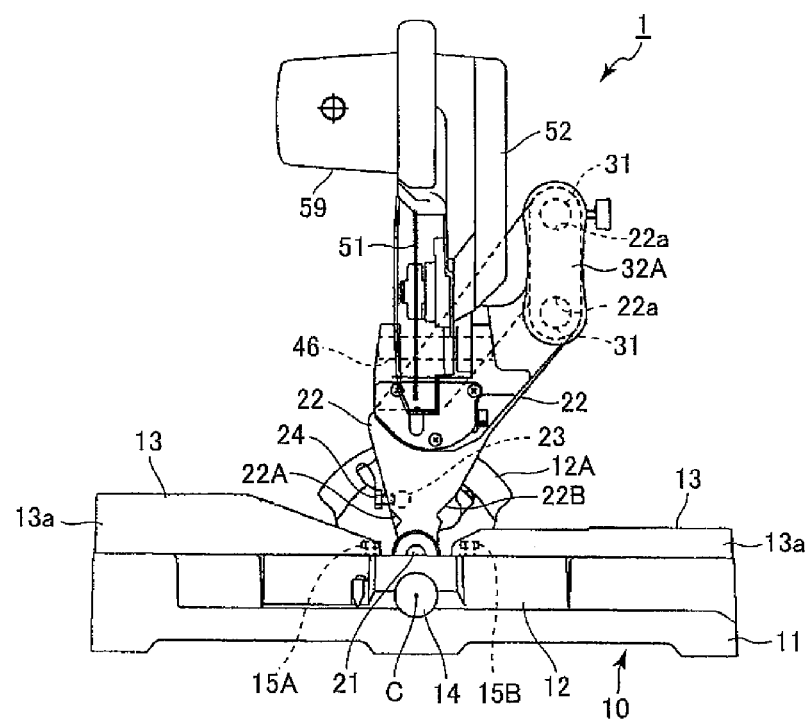
FIG. 4 is a front view of the miter saw and particularly showing a vertical orientation of a guide bar support section and the saw blade section.

As shown in FIGS. 4, 6, and 7, stop portions 22A and 22B are formed at lateral end faces of the holder 22 for regulating a laterally tilting angle of the holder 22. Further, stop bolts 15A, 15B vertically extend from the upper rear surface of the turntable 12 at position on a locus of the stop portions 22A, 22B. The stop bolts 15A, 15B are threaded into the turntable 12. If the holder 22 is tilted in the lateral direction, the stop portion 22A or 22B is brought into abutment with the head of the stop bolt 15A or 15B, whereupon the tilting angle of the holder 22 can be set. Ordinarily, the stop bolts 15A, 15B are provided to laterally tilt the holder 22 at an angle of 45 degrees upon abutment with the stop portion 15A, 15B.

A pin 23 extends through the through-hole 12a of the turntable 12 and is movable between frontmost and rearmost positions for regulating the vertical orientation of the holder 22. A stop bolt 24 horizontally extends through the holder 22. A tip end of the stop bolt 24 is positioned abuttable on an outer peripheral surface of the pin 23 when the pin 23 is positioned at its frontmost position and when the holder 22 is at its vertical position. The tip end of the stop bolt 24 is positioned offset from the outer peripheral surface of the pin 23 when the pin 23 is displaced to its rearmost position. The holder fixing mechanism 70 is adapted for fixing a laterally tilting angle of the holder 22. Upon fixing the pivot angle of the holder 22, the tilting angle of the circular saw blade 51 is fixed, thereby performing slant cutting.

The turntable 12 has the rearmost upstanding portion 12A whose upper end portion is configured into an arcuate shape protruding upwardly as shown in FIG. 4, to form an engagement region 71. A holder 22 is provided with a protruding portion 72 including a horizontal section 72A protruding rearwardly from a rear surface 22b of the holder 22 and a vertical section 72B extending downwardly from the horizontal section 72A. Thus, a part of the engagement region 71 is surrounded by the rear surface 22b of the holder 22 and the protruding portion 72.

The vertical section 72B has an inward slant wall surface 72a inclined such that a distance between the slant wall surface 72a and the rear surface of the engagement region 71 is gradually increased toward the axis of the holder shaft 21. Further, a slider 73 is movably disposed between the engagement region 71 and the vertical section 72B. The slider 73 has a rear slant wall surface complementary with the slant wall surface 72a and in sliding contact therewith. The horizontal section 72A is formed with a through-hole 72b extending toward the axis of the holder shaft 21.

A clamp bolt 74 extends through the through-hole 72b and is rotatable about its axis. An inner diameter of the through-hole 72b is slightly greater than an outer diameter of the clamp bolt 74. The clamp bolt 74 has a tip end threadingly engaged with the slider 73. A spring 75 is disposed over the clamp bolt 74 and is interposed between the horizontal section 72A and the slider 73 for normally urging the slider 73 toward the holder shaft 21. By the rotation of the clamp bolt 74, the slider 73 is moved along an axis of the clamp bolt 74.

In a state shown in FIG. 1, the pivot position of the holder 22 relative to the turntable 12 is fixed. In this state, the slider 73 is at its uppermost position, so that the engagement region 71 of the turntable 12 is clamped between the rear surface 22b of the holder 22 and the slider 73. Thus, the holder 22 is immovable relative to the turntable 12.

For laterally tilting the saw blade section 50, the clamp bolt 74 is unfastened for releasing the holder 22. By this unclamping, the slider 73 is moved downward by expansion of the spring 75 in its axial direction. Thus, contacting force between the rear surface 22b of the holder 22 and the engagement region 71 of the turntable 12 is weakened, so that the holder 22 is freely pivotally movable relative to the turntable 12 about the axis of the holder shaft 21. As a result, the holder 22 can be tilted rightwardly or leftwardly. Then, the clamping is again performed while the user holds the saw blade section 50 at its desired pivot posture.

Figure 2:
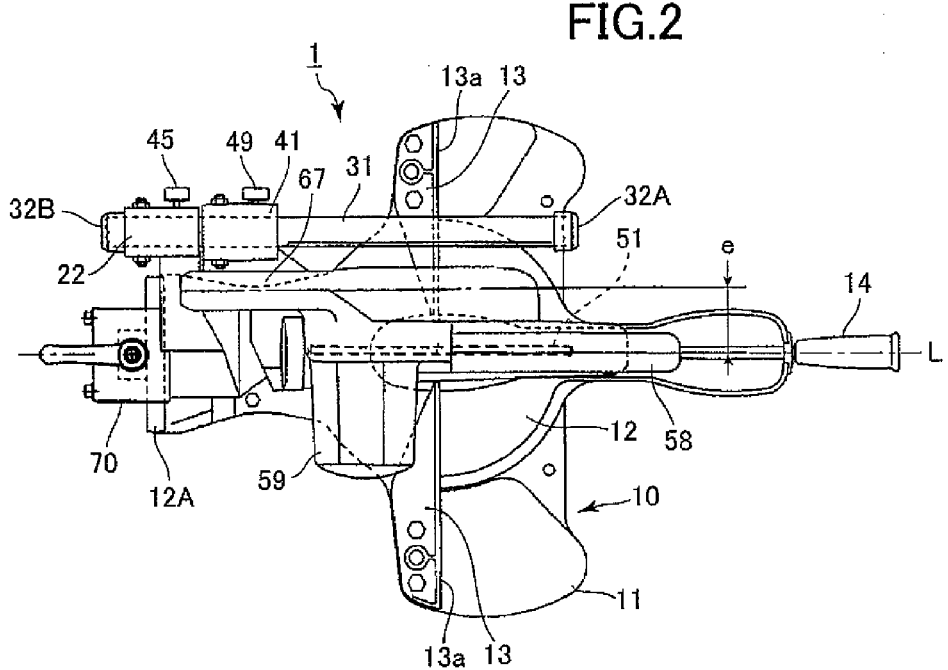
FIG. 2 is a plan view of the miter saw of FIG. 1.
Figure 3:
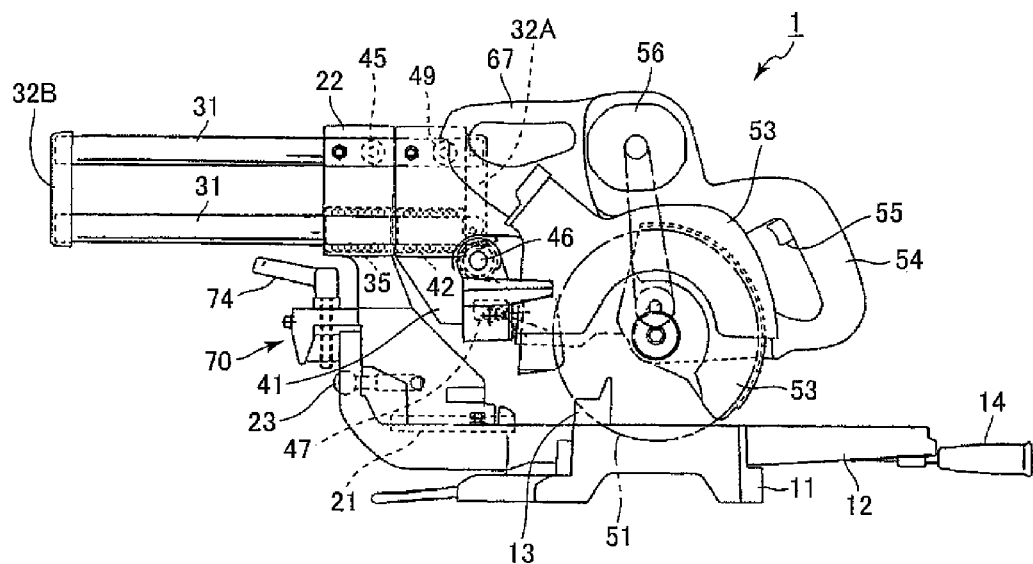
FIG. 3 is a side view of the miter saw according to the first embodiment, and showing a state where the guide bars protrude to its rearmost position.
Figure 5:
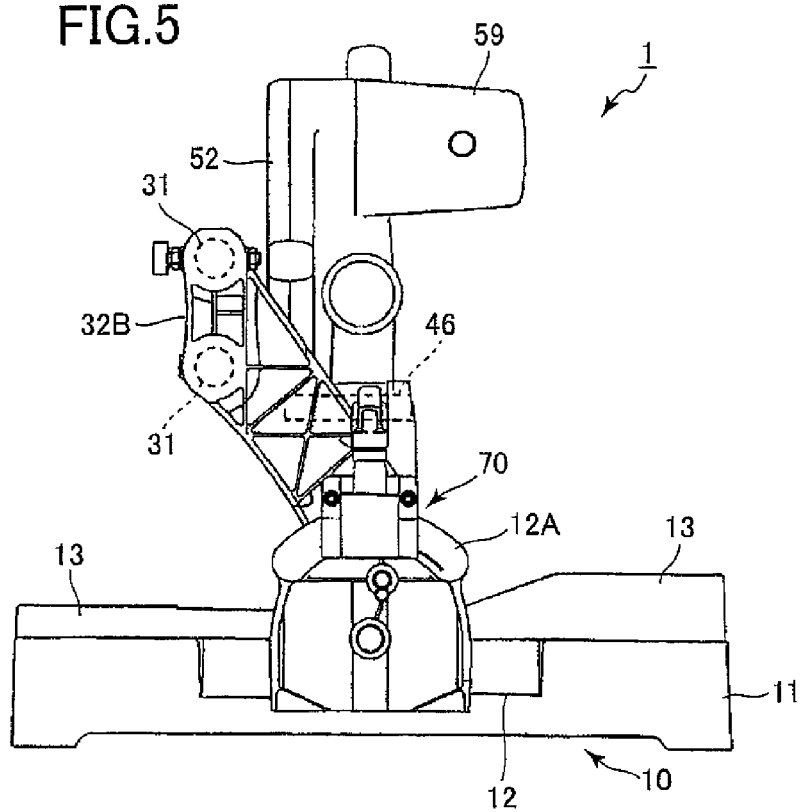
FIG. 5 is a back view of the miter saw and particularly showing a vertical orientation of a guide bar support section and the saw blade section.

As shown in FIGS. 2, 4, and 5, the upper end portion of the holder 22 is positioned laterally displaced from the lateral center C of the base section 10 (FIG. 4), and is formed with a pair of bores 22a, 22a extending in parallel with the side surface of the circular saw blade 51 as shown in FIG. 2 and in parallel with the upper surface of the base 11 as shown in FIG. 3. When the holder 22 is at its vertical posture shown in FIG. 4, the pair of bores 22a, 22a are arrayed in a vertical plane.

The guide bar section 30 generally includes a pair of guide bars 31, 31 and front and back end cap 32A and 32B. The guide bars 31 have lengths equal to each other and shorter than a longitudinal length of the turntable 12 (the longitudinal length extends in the frontward/rearward direction). The guide bars 31 have a tubular shape and have a circular cross-section whose outer diameter is substantially equal to an inner diameters of the pair of bores 22a, 22a. The guide bars 31 provide sufficient rigidity.

The rear end of each guide bar 31 is inserted through each bore 22a. In order to avoid accidental release of the guide bars 31 from the bores 22a or to avoid accidental rotation of the guide bars 31 about their axes within the bores 22a, each both ends of the guide bar 31 are fixed to the front and back end caps 32A and 32B, respectively.

To this effect, the caps 32A and 32B are formed with a pair of bores 32a, 32a extending in parallel with each other and having inner diameter substantially equal to the outer diameter of the guide bar 31. Further, a pair of female threads in communication with the respective bores 32a are formed in the end caps 32A and 32B in a radial direction of the guide bar 31, and fixing bolts 34 are threadingly engaged with the corresponding female threads, so that tip ends of the fixing bolts 34 can press against the outer peripheral surfaces of the front end portion of the guide bars 31. Thus, rotation of the guide bars 31 relative to the end caps 32A and 32B is prevented, and the front end cap 32A is fixedly secured to each front end of the guide bar 31. Thus rear ends and front ends of the guide bars 31 are fixed to the holder 22, and the front end cap 23, respectively.

The guide bars 31 extend substantially in parallel with the side surface of the circular saw blade 51 as shown in FIG. 2 and substantially in parallel with the upper surface of the base 11 as shown in FIG. 3. When the holder 22 is at its vertical posture shown in FIG. 4, the guide bars 31 are arrayed in a vertical plane parallel to the side surface of the circular saw blade 31. The above structure of the guide bars 31 can enhance and improve the stiffness of the guide bars 31 against the load applied to the guide bars 31 when the miter saw is carried.

Alternatively, the outer diameter of the guide bars 31 is slightly greater than the inner diameters of the pair of bores 22a, 22a.

Figure 8:
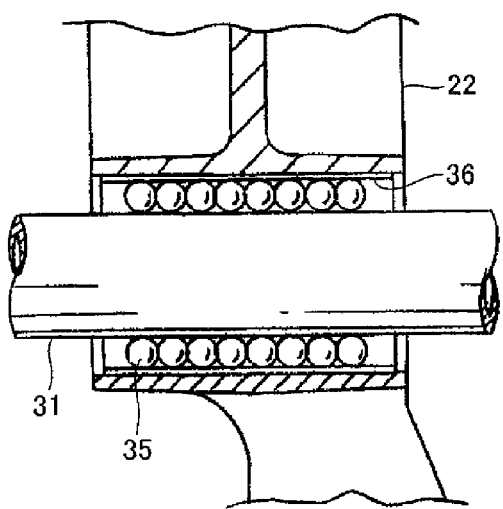
FIG. 8 is a partially sectional view showing a structure of the holder supporting a guide bar.
Figure 9:
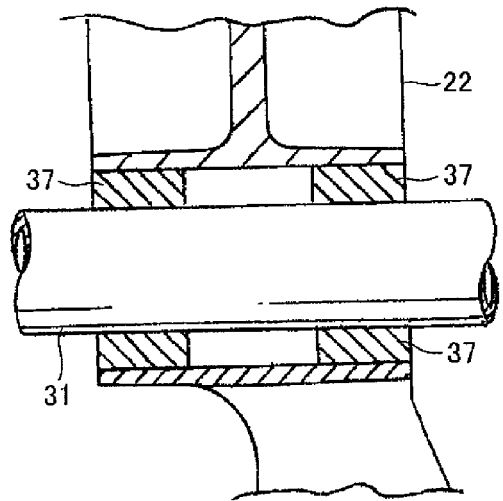
FIG. 9 is a partially sectional view showing another structure of the holder supporting the guide bar.

As shown in FIG. 8, the lower guide bar 31 is slidably supported by a ball bearing 35 provided in a guide bar through-hole 36 in the upper part of the holder 22. Alternatively, referring to FIG. 9, the guide bar 31 may be slidably supported by an oil-impregnated metal 37 with respect to the holder 22.

Figure 10:
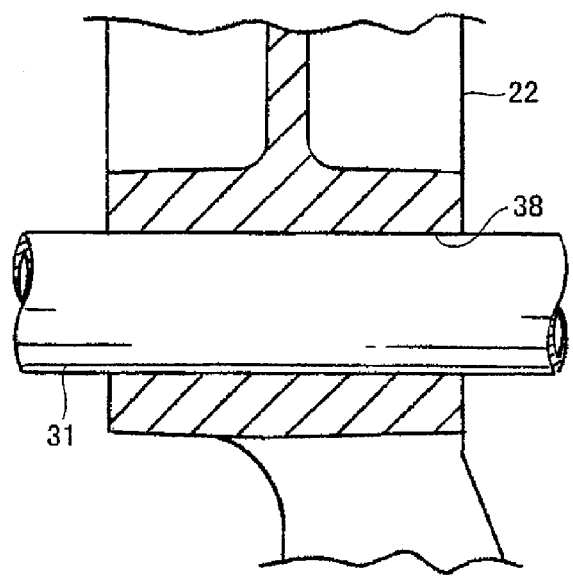
FIG. 10 is a partially sectional view showing further structure of the holder supporting the guide bar.

Alternatively, referring to FIG. 10, the guide bar 31 may be inserted in the guide bar through-hole 37 without intervening any member therebetween and be slidably supported to the holder 22.

A knob 45 is threadingly engaged with the upper part of holder 22. By rotating the knob 45, the tip end of the knob 45 is pressed against the outer surface of the guide bar 31 so that the movement of the guide bar 31 relative to the holder 22 is restricted.

Figure 11:
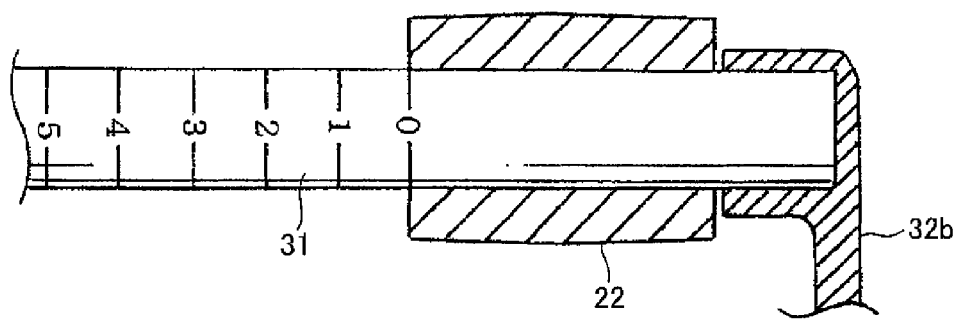
FIG. 11 is a partially sectional view showing still further structure of the holder supporting the guide bar, wherein the guide bar has a plurality of mark indicating a positional relationship with respect to the holder.

As shown in FIG. 11, a scale or marks can be formed on the upper guide bar 31. In this case, this scale can indicate a sliding amount of the guide bar 31 with respect to the holder 22.

Figure 12:
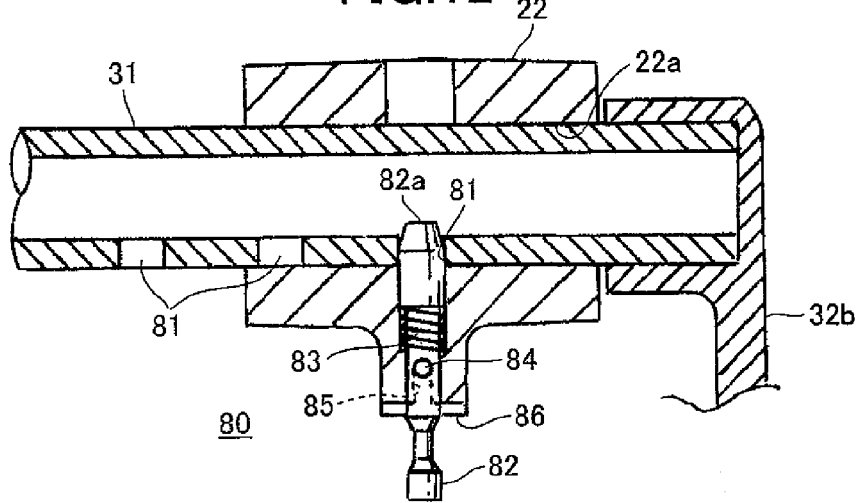
FIG. 12 is a partially sectional view showing another structure of the holder and an engaging mechanism with the guide bar.

Referring to FIG. 12, an engaging mechanism 80 to engage the guide bar 31 to the holder 22 is provided. One of the guide bars 31 has a plurality of through-holes 81 formed at predetermined intervals in a longitudinal direction. A stopper pin 82 is slidably inserted through an side surface of the guide bar 31 in an orthogonal direction to the sliding direction of the guide bar 31. The stopper pin 82 is urged against the guide bar 31 by a spring 83 provided in the holder 22. The tip end 82a of the stopper pin 82 is selectively engaged with one of the plurality of through-holes 81, so that the guide bar 31 is latched with the holder 22. Thus, the sliding amount of the guide bar 31 with respect to the holder 22 can be adjusted stepwisely.

When the stopper pin 82 is pulled out from the stat shown in FIG. 12 against the elastic force of the spring 83, the tip end of the stopper pin 82 is released from the through-hole 81 of the guide bar 31. Accordingly, the guide bar 31 is freely slidable with respect to the holder 22. In this embodiment, a pin 84 is inserted through and fixed to the stopper pin 82 in an orthogonal direction to the longitudinal direction of the stopper pin 82. The pin 84 is slidable in a guide slot 85 formed in the holder 22. When the stopper pin 82 is pulled out from the state shown in FIG. 12 and rotated about its axis by 90 degrees, the stopper pin 82 is engaged into a slot 86 formed on the holder 22. Accordingly, the tip end 82a of the stopper pin 82 is retrieved from the bore 22a of the holder 22. Therefore, the retrieved stopper pin 82 does not prevent the guide bar 31 from sliding with respect to the holder 22.

The saw blade support section 40 is adapted to pivotally movably support the saw blade section 50, and is movable relative to the guide bars 31 between a rearmost position defined by the holder 22 and a frontmost position defined by the front end cap 32A. Further, the saw blade support section 40 can be selectively fixed to the guide bars 31.

Figure 13:
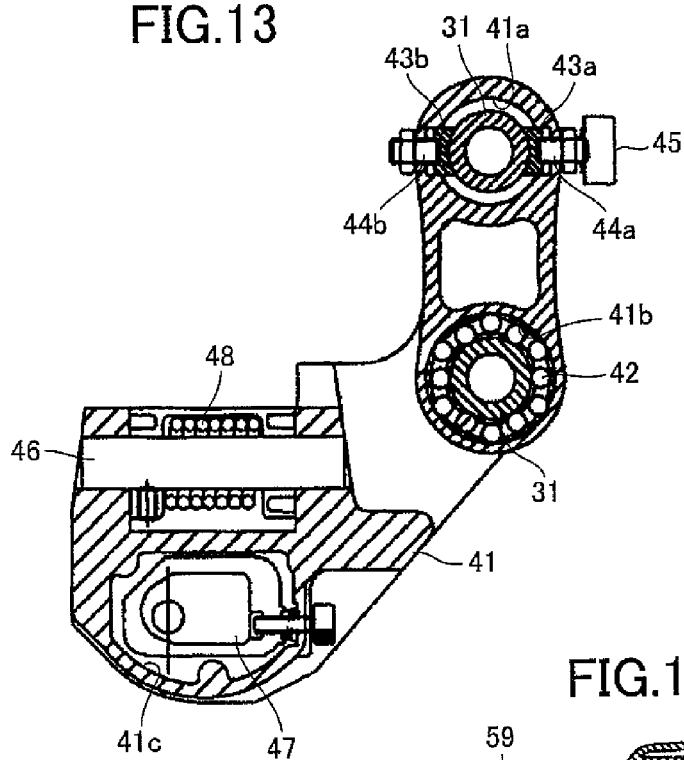
FIG. 13 is a cross-sectional view taken along the line VII-VII in FIG. 1 for particularly showing a saw blade support section.

The saw blade support section 40 includes a support segment 41 slidably movable between the holder 22 and the front end cap 32A. The saw blade section 50 is movably supported on the support segment 41. More specifically, as shown in FIG. 13, the support segment 41 is formed with an upper bore 41a and a lower bore 41b through which the upper guide bar 31 and the lower guide bar 31 extend, respectively. The upper bore 41a is substantially concentric with the upper guide bar 31 and has an inner diameter greater than the outer diameter of the upper guide bar 31. The lower bore 41b is substantially concentric with the lower guide bar 31 and has an inner diameter greater than the outer diameter of the lower guide bar 31.

A ball bearing 42 is disposed in the lower bore 41b. The ball bearing 42 has an inner diameter approximately equal to the outer diameter of the lower guide bar 31, and has an outer peripheral surface in sliding contact with the lower bore 41b.

The lower bore 41b has an axial length approximately equal to an axial length of the ball bearing 42. This axial length is the minimum length for maintaining sufficient sliding performance of the support segment 41 relative to the guide bars 31. It should be noted that the lower guide bar 31 can be supported in the lower bore 41b by an oil-impregnated metal as shown in FIG. 10 instead of the ball bearing 42.

Two sliding segments 43a, 43b are disposed in the upper bore 41a and in sliding contact with the outer peripheral surface of the upper guide bar 31. Bolts 44a, 44b extend in radial direction of the upper guide bar 31 and are threadingly engaged with the support segment 41. The bolts 44a, 44b have inner ends supporting the sliding segments 43a, 43b. Thus, the sliding segments 43a, 43b are movable in the radial direction of the upper guide bar 31 by the axial movement of the bolts 44a, 44b caused by the threading engagement. A knob 49 is threadingly engaged with the support segment 41 and is engageable with the upper guide bar 31. By fastening the knob 49, the tip end of the knob 45 is pressed against the outer surface of the guide bar 31, so that the movement of the support segment 41 relative to the upper guide bar 31 can be stopped.

In FIG. 13, by controlling the axial positions of the bolts 44a and 44b caused by the threading advancement or retraction thereof, the positions of the two sliding segments 43a, 43b can be changed. Thus, relative position between the support segment 41 and the upper guide bar 31 can be changed. That is, a minute pivotal movement of the support segment 41 about an axis of the lower guide bar 31 can be performed. To be more specific, by moving the two sliding segments 43a, 43b leftwardly, the left end of the upper guide bore 31 is moved toward the upper bore 41a, i.e., the support segment 41 is pivotally and finely moved in a clockwise direction in FIG. 13 about the axis of the lower guide bar 31. Consequently, the saw blade section 50 and its circular saw blade 51 are also povitally moved about the axis of the lower guide bar 31. Thus, an angle of a side surface of the circular saw blade 51 relative to the upper surface of the base 11 can be finely controlled.

The rearmost position of the saw blade support section 40 is defined by the abutment of the support segment 41 onto the holder 22, and the frontmost position of the saw blade support section 40 is defined by the abutment of the support segment 41 onto the front end cap 32A. Moreover, the disengagement of the support segment 41 from the guide bars 31 can be prevented by the front end cap 32A. Incidentally, since only the support segment 41 supporting the saw blade section 50 is slidingly moved on the guide bars 31, only a small amount of load is imparted on the ball bearing 42 in a direction perpendicular to the sliding direction. Further, the load is constant regardless of the sliding position of the support segment 41 relative to the guide bars 31. Accordingly, a compact ball bearing 42 is available.

As shown in FIG. 13, a pivot shaft 46 laterally extends through the support segment 41 in a direction perpendicular to the axial direction of the guide bars 31. The saw blade section 50 is pivotally movable about an axis of the pivot shaft 46. A recess 41c is formed in the support segment 41 at a position below the pivot shaft 46. A laser oscillator 47 is disposed in the recess 41c. The laser oscillator 47 is movable within the recess 41c at least in the axial direction of the circular saw blade 51, so that the laser beam can extends along the side surface of the circular saw blade 51. Thus, a cutting line which is an extension of the side surface can be irradiated onto the workpiece W to be cut. This facilitates recognition of the position of the circular saw blade 51 prior to cutting, thereby enhancing operability.

Within the recess 41c, a spring 48 is disposed. The spring 48 is disposed over the pivot shaft 46 and has one end acting on the support segment 41 and another end acting on the saw blade section 50 for normally urging the saw blade section 50 to pivotally move away from the upper surface of the base 11 about the axis of the pivot shaft 46. A stop mechanism (not shown) is provided for maintaining the saw blade section 50 at its uppermost position during non-operating state. For the cutting operation, the saw blade section 50 is pivotally moved downwardly against the biasing force of the spring 48.

As described above, when the guide bars 31 are fixed to the holder 22 by knob 45, the guide bars 31 are not protrudingly moved rearwardly from the holder 22 during cutting, and the holder 22 does not move away from the base section 10 in frontward/rearward direction during cutting. Therefore, entire miter saw 1 becomes compact even during cutting operation. Thus, cutting work can be performed in a narrow space. In other words, it is unnecessary to provide a surplus space between an ambient wall and the rearmost end of the miter saw 1.

Figure 14:
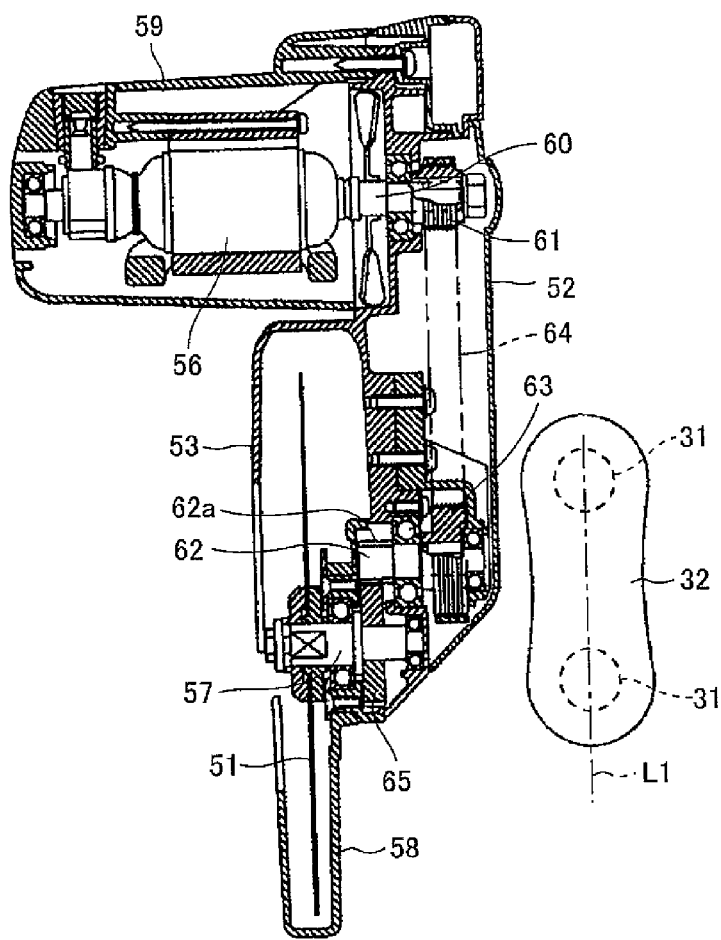
FIG. 14 is a cross-sectional view taken along the line IX-IX of FIG. 1 for particularly showing the saw blade section.

Referring to FIG. 14, the saw blade section 50 includes a gear case 52 pivotally movably supported to the support segment 41 through the pivot shaft 46. A saw blade cover 53 is provided integrally with the gear case 52 for covering an upper half of the circular saw blade 51.

A saw blade shaft 57 is rotatably supported on the gear case 52. The circular saw blade 51 is coaxially mounted on the saw blade shaft 57. A safety cover 58 is pivotally supported to the gear cover 52 for protectively covering a portion of the circular saw blade 51 projecting out of the saw blade cover 53. The safety cover 58 is adapted to cover the projecting out portion of the circular saw blade 51 when the saw blade section 50 is at the upper pivot position shown in FIG. 1, and to expose the projecting out portion to the atmosphere when the saw blade section 50 is at the lower pivot position shown in FIG. 3. To this effect, a link mechanism (not shown) is provided for pivotally retracting the safety cover 58 into the saw blade cover 53.

A motor housing 59 is fixed to the gear cover 52. The motor housing 59 houses therein the motor 56 which has a motor shaft 60 extending in parallel with the saw blade shaft 57 and supported rotatably on the gear case 52. The motor 56 is positioned such that an imaginary plane containing the side surface of the circular saw blade 51 intersects a part of the motor 56. Further, a handle 54 is provided integrally with the motor housing 59 (See FIG. 1). The handle 54 is located on an imaginary plane containing the side surface of the circular saw blade 51. With this arrangement, reaction force imparted on the saw blade section 50 through the circular saw blade 51 during cutting can be properly received by the handle 54. In other words, reaction force from the circular saw blade 51 is linearly transmitted to the handle 54 without any deviation. A switch 55 is provided to the handle 54 for driving a motor 56, as shown in FIG. 1.

A sub-handle 67 as a transfer handle is provided integrally with the motor housing 59 (See FIG. 1). The sub-handle 67 extends in a direction parallel with the guide bars 31 when the saw blade section 50 is pivotally moved to its most downward position as shown in FIG. 3. As shown in FIG. 2, the sub-handle 67 is deviated away from the center line L including the lateral center C, which is aligned with the center of the cutting width of the circular saw blade 51. In other words, the sub-handle 67 is positioned between the side surface of the circular saw blade 51 and the guide bars 31, when viewed from above.

Referring to FIG. 14 again, a power transmission mechanism is provided in the gear case 52 for transmitting the rotation of the motor shaft 60 to the saw blade shaft 57. The transmission mechanism includes a motor shaft pulley 61, an intermediate shaft 62, an intermediate shaft pulley 63, an endless belt 64, a pinion 62a, and a gear 65. The motor shaft pulley 61 is fixed to a tip end of the motor shaft 60 at which a fan is fixed. The intermediate shaft 62 is positioned close to and in parallel with the saw blade shaft 57 and is rotatably supported on the gear case 52. The intermediate shaft pulley 63 is integrally rotatable with the intermediate shaft 62 and is disposed at a side opposite to the circular saw blade 51. The endless belt 64 is mounted on the motor shaft pulley 61 and the intermediate shaft pulley 63.

The pinion 62a is formed at an outer peripheral surface of the intermediate shaft 62 and at a side opposite to the intermediate shaft pulley 63. The pinion 62a is positioned closest to the circular saw blade 51 among the components on the intermediate shaft 62. The gear 65 is force-fitted with the saw blade shaft 57. As a result, the gear 65 is rotatable together with the rotation of the saw blade shaft 57 and in alignment with the pinion 62a for meshing engagement therewith.

As shown in FIGS. 4 and 13, the upper and lower guide bars 31, 31 are arrayed in a direction parallel with the side surface of the circular saw blade 51. That is, an imaginary line L1 connecting axes of the upper and lower guide bars 31,31 extends substantially in parallel with the side surface of the circular saw blade 51. With this arrangement, rigidity of the sliding segments 43a, 43b and rigidity of the bores 22a of the holder 22 can be maintained when the saw blade section 50 is pivotally moved downwardly and when the miter saw 1 is hand-carried while gripping the sub-handle 67.

The saw blade support section 40 is provided with a fixing arrangement (not shown) for fixing the lowermost pivot posture of the saw blade section 50 relative to the support segment 41.

By using the above fixing arrangement, the lowermost pivot posture of the saw blade section 50 is fixed. Simultaneously, the guide bar support section 20 is maintained at its vertical position with respect to the base section 10, as shown in FIGS. 4 and 5. In addition, as shown in FIG. 15, the guide bars 31 are moved frontward until the back end cap 32B contacts the holder 22. Then, the guide bar 31 is fixed to the holder 22 by clamping the knob 45. On the other hand, the saw blade support section 40 supporting the saw blade section 50 is moved rearward along the guide bars 31 until the saw blade support section 40 contacts the holder 22. Then, the saw support section 40 is fixed to the guide bars 31 by clamping the knob 49. Accordingly, the user can carry the miter saw 1 by gripping the sub-handle 67. In this state, the sub-handle 67 is located at the position in proximity to the barycenter of the miter saw 1 in the longitudinal direction thereof.

In this condition of the miter saw 1, the saw blade section 50 having a considerable weight is positioned in a substantially center of the miter saw 1 in the frontward/rearward direction (the longitudinal direction thereof), as shown in FIG. 2. In addition, the sub-handle 67 is positioned in a substantially center position between the circular saw blade 51 on the center line L and the guide bars 31 deviated from the center line in the width direction of the miter saw 1. In other words, the sub-handle 67 is positioned in proximity to the barycenter of the miter saw 1 in the width direction thereof.

As described above, the weight balance of the miter saw 1 in the frontward/rearward direction and the width direction is readily maintained when the miter saw 1 is carried. During the transportation of the miter saw 1, the miter saw 1 can be readily and stably carried without tilting toward leftward/rightward direction.

Further, when the lowermost pivot posture of the saw blade section 50 is fixed and maintained by the fixing arrangement, a handle portion of the sub-handle 67 is maintained parallel to the horizontal direction. Due to this structure, it is easy for the user to carry the miter saw 1.

As described above, the weight balance is readily achieved with respect to the frontward/rearward and width directions when the miter saw 1 is carried by gripping the sub-handle 67. Accordingly, the miter saw 1 can be readily carried in a substantially horizontal position without inclining the miter saw 1 to a large extent.

The next description will be made for explaining the operation of the miter saw 1.

For cutting a wooden workpiece W having a narrow width as shown in FIG. 1, the guide bars 31 are first moved frontward until the back end cap 32B contacts the holder 22. The guide bars 31 are fixed to the holder 22 by clamping the knob 45. Next, the saw blade support section 40 is moved rearward along the guide bars 31 until the saw blade support section 40 contacts the holder 22. The saw blade support section 40 is fixed to the guide bars 31 by clamping knob 49. At this time, the holder 22 is maintained at its vertical position with respect to the base section 10 as shown in FIGS. 4 and 5.

Next, the motor 56 is energized upon pressing the switch 55 for rotating the motor shaft 60, whereupon the circular saw blade 51 is rotated through the pulley 52, the transmission belt 64, the intermediate shaft pulley 63 and the saw blade shaft 57. While maintaining this state, an operator grips the handle 54 and pushes the saw blade section 50 downwardly against the biasing force of the spring 48. The circular saw blade 51 is cutting a cutting line on the workpiece W irradiated by a laser beam from the laser oscillator 47, and entering into a groove (not shown) formed on the turntable 12. Then, the movement of the circular saw blade 51 into the groove is restrained by a stopper mechanism (not shown) after the depth of the circular saw blade 51 in the groove reaches a predetermined distance. Thus, the workpiece W can be cut. If cutting to the workpiece W is completed, the operator pulls up the handle 54, so that the saw blade section 50 can restore its original uppermost position by the biasing force of the spring 48.

For performing a vertical cutting in which the side surface of the circular saw blade 51 extends vertically, the clamp lever 71 is unfastened and the pin 23 is displaced frontwardly. Then, the holder 22 is pivotally moved toward its vertical posture. As a result, the pin 23 abuts the stop bolt 24 whereupon the vertical orientation of the circular saw blade 51 is established. Then, the clamp lever 71 is fastened in the above-described manner.

In order to cut the workpiece W in a slanting direction with respect to its longitudinal direction, the knob 14 is first rotated to release the rotational lock of the turntable 12 with respect to the base 11. The turntable 12 is rotated with respect to the base 11 in a horizontal plane by a predetermined amount of angle by means of the knob 14, while maintaining the holder 22 at its vertical position. Accordingly, the guide bar support section 20, the guide bar section 30, the saw blade support section 40, and the saw blade section 50 are rotated integrally with the turntable 12, so that an angle of the side surface of the circular saw blade 51 with respect to the workpiece W is changed. Then, the workpiece can be cut in the slanting direction when viewed from above, by operating the miter saw 1 in the above-described manner.

In order to cut the workpiece W from an angle inclined from the vertical direction, the holder 22 is first unclamped with respect to the base 11 by releasing the clamp bolt 74. Then the holder 22 is tilted with respect to the base 11 in the lateral direction as shown in FIGS. 6 and 7. The clamp bolt 74 is clamped again so that the holder is fixed to the base 11 at a desired angle from the vertical direction. For example, the holder 22 is inclined at angle of 45 degrees when the stop portion 22A or 22B is brought into abutment with the head of the stop bolt 15A or 15B. Accordingly, the circular saw blade 51 is inclined from the vertical direction by the same angle as that of the holder 22. Therefore, the miter saw 1 can cut the workpiece W from the inclined direction set by the guide bar support section 20.

As described above, the workpiece W is cut by the miter saw 1 while the guide bars being positioned frontward with respect to the holder 22. In this condition, the guide bars do not protrude rearward from the holder 22. With this structure of the miter saw 1, the cutting operation by the miter saw 1 can be performed even in the small working area resulting from a wall and/or an obstacle behind the holder 22.

On the other hand, if there is no wall or obstacle behind the holder 22, the guide bars 31 can be slid rearward until the saw blade support section 40 contacts the holder 22, as shown in FIG. 3. In other words, the guide bars 31 are protruded from the holder 22 to a large extent. In this case, the cutting operation can be performed without paying considerable attention to the guide bars 31. Therefore, the operability of the miter saw 1 can be improved if a sufficient working area is prepared.

The next description will be made for explaining the cutting an elongated workpiece W. When there is an obstacle such as a wall and an object, the guide bars 31 are moved frontward until the back end cap 32B contacts the holder 22, as shown in FIG. 1. The guide bars 31 are fixed to the holder 22 by the knob 45. Then, the saw blade support section 40 is released from the guide bars 31 by unclamping the knob 49. Next, the saw blade section 50 is moved frontward along the guide bars 31, as shown in FIG. 16. The handle 54 is pressed downward and rotated about pivot shaft 46 against the elastic force of the spring 48, while rotating the circular saw blade 51. Then, the saw blade section 50 is moved rearward along the guide bars 31 to the position shown in FIG. 1 by pushing the handle 54. At this time, the workpiece W is cut, because the circular saw blade 51 moves along the line on the workpiece W irradiated by the laser beam L from the laser oscillator 47. The workpiece is cut from the vertical direction.

Thus, for cutting the workpiece having an elongated length in the frontward/rearward direction, the support segment 41 carrying the saw blade section 50 is provisionally moved to its frontmost position along the guide bars 31. Then, after the saw blade section 50 is pivoted downwardly, the saw blade section 50 is moved rearwardly along the guide bars 31 while claming the downward pivot position by the stop mechanism. In this case, the knob 45 is released.

A workpiece having a wide area can be subjected to angled cutting and slant cutting as well as the above-described vertical cutting by moving the saw blade section 50 in the frontward/rearward direction. The angled cutting implies that the cutting line on the workpiece W is slanted with respect to the frontward/rearward direction. This angled cutting is achievable by angularly rotating the turntable 12 to change the geometrical relationship between the fences 13 and the side surface of the circular saw blade 51. The slant cutting implies that the cutting line in a thickness direction of the workpiece is slanted by controlling the pivot angle of the holder 22 relative to the turntable 12. To this effect, the knob 45 is loosened for facilitating sliding movement of the support segment 41 relative to the guide bars 31. In this way, composite cutting is achievable including vertical cutting, angled cutting and slant cutting.

As described above, the cutting operation can be performed, while moving the saw blade support section 40 along the guide bars 31, when the guide bars 31 protrude frontward from the holder 22. In this case, the guide bars 31 do not protrude rearward from the holder 22. Accordingly, the cutting operation can be performed even in a small work space which is restricted by a wall and/or an object behind the holder 21.

In the above embodiment, the knob 45 is provided in order to fix the guide bars 31 to the holder 22. In another embodiment, a slide resistance value of the guide bars 31 relative to the holder 22 can be set larger than the slide resistance value of the support segment 41 relative to the guide bars 31. In this case, the knob 45 can be eliminated. This is because the guide bars 31 can be slid with respect to the holder 22, only when a larger force than a predetermined value is acted to the guide bars 31. And, the guide bars 31 does not slide with respect to the holder 22 when the support segment 41 slides along the guide bars 31. Accordingly, this structure avoids the guide bars 31 from unintentionally sliding with respect to the holder 22 during the cutting operation.

The support segment 41 is slidably supported through the ball bearing 42 by the guide bars 31. Accordingly, the saw blade support section 40 supporting the saw blade section 50 can be moved and slid smoothly along the guide bars 31 by the action of a smaller force. As a result, the operability of the cutting operation can be improved. Deformation of the bores 41a and 41b can be avoided.

Figure 17:
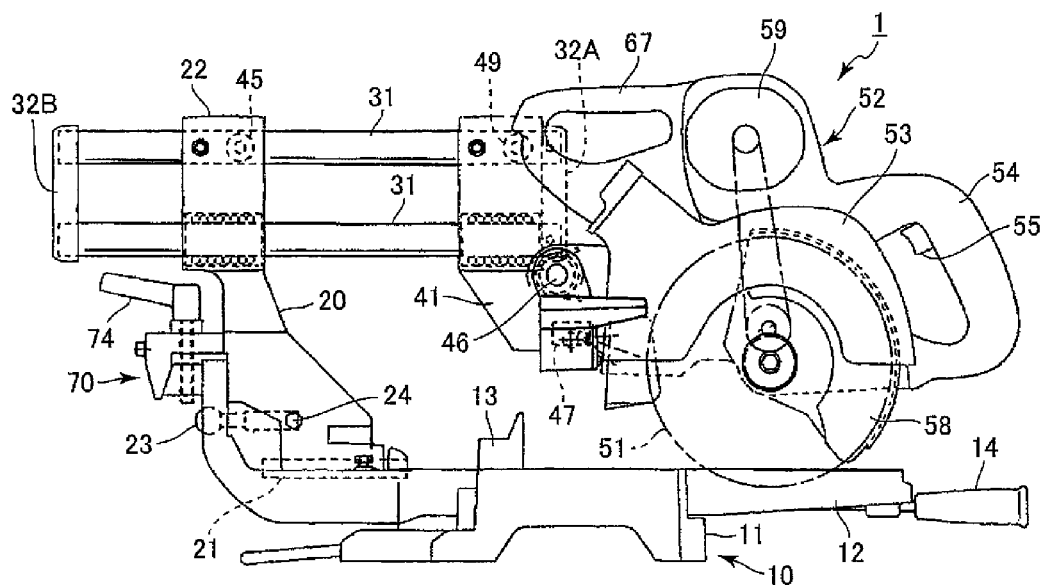
FIG. 17 is a side view of the miter saw in a cutting state.

When a kind of obstacle such as a wall and/or an object does not exist behind the holder 22, the support segment 41 is first fixed to the front portion of the guide bars 31 by clamping the knob 49, as shown in FIG. 3. And the clamp of the guide bars 31 to the holder 22 is released. The support segment 41 is moved rearward together with the guide bars 31 with respect to the holder 22, while maintaining the circular saw blade 51 at the lowermost pivotal position with the handle 54, until the support segment 41 contacts the holder 22. As a result, the guide bars 31 can be protruded behind from the holder 22. From this state, if the circular saw blade 51 is moved frontward along the holder 22 by means of the handle 54 together with the guide bars 31 as shown in FIG. 17, an elongated workpiece W can be cut from the vertical direction by the rotating circular saw blade 51 along the laser light on the workpiece irradiated by the laser oscillator 47. In this case, composite cutting is achievable including vertical cutting, angled cutting, and slant cutting. It should be noted that the circular saw blade 51 cuts the portion which has irradiated by the laser light without interfering with the laser light, because the laser light is interrupted by the saw blade cover 53 during the cutting operation of the circular saw blade 51.

As described above, after protruding the guide bars 31 behind from the holder 22 to a large extent, the cutting operation can be performed, while moving the circular saw blade 51 and the support segment 41 together with the guide bars 31. In this case, the user does not have to pay a considerable attention to the guide bars 31 when cutting the workpiece W. Accordingly, the workability for cutting a workpiece W can be improved if a sufficient space is prepared for the cutting operation.

In the above embodiment, the guide bars 31 have lengths shorter than the longitudinal length of the base section 10. Therefore, the guide bars 31 do not protrude forward from the base section 10 in the longitudinal direction of the miter saw 1, even during the cutting operation in the small space. Accordingly, the working area required for the miter saw 1 to cut the workpiece W can be reduced. In other words, even in a small working area, the cutting operation by the miter saw 1 becomes possible. In addition, the longitudinal size of the miter saw 1 can be minimized when the miter saw 1 is carried. These arrangement contributes to the operability of the miter saw 1 during its transportation.

In the above embodiment, two guide bars 31 are provided. Two front ends of the guide bars 31 are joined with the front end cap 32A and two rear ends of the guide bars 31 are joined with the back end cap 32B. This structure of guide bars 31 enhances and improves supporting ability of the guide bars 31 to the holder 22, and contributes to the supporting ability of the support segment 41 to the guide bars 31. Therefore, the sliding ability of the guide bars 31 along the holder 22 and the sliding ability of the support segment 41 along the guide bars 31 are enhanced and improved. In addition, the end caps 32A and 32B can readily prevent the guide bars 31 from releasing from the holder 22.

In addition, the guide bars 31, 31 are arrayed in a direction substantially parallel with the side surface of the circular saw blade 51, when the holder 22 is at the vertical position. This arrangement contributes to the rigidity against the load of the guide bars 31 exerted when the miter saw 1 is carried.

In the above embodiment, the ball bearings 35 and 42 or the oil-impregnated metal 25 are provided in the bores 22a of the holder 22 and the bore 41b of the support segment 41 to suppress the slide resistance of the guide bars 31 relative to the holder 22 and the slide resistance of the support segment 41 relative to the guide bars 31. This structure contributes to the sliding ability of the guide bars 31 and the support segment 41. If a member having a small slide resistance is used instead of the ball bearings 35 and 42, the user can select one of two operations for the cutting operation: the user slides the support segment 41 with respect to the guide bars 31, or the user slides the guide bars 31 with respect to the holder 22. These options can improve the workability.

The next description will be made for explaining the second embodiment of the present invention. In this embodiment, the identical elements to those shown in FIG. 1 are assigned the same numeral as those of FIG. 1, and their detailed explanation will be omitted.

Figure 18:
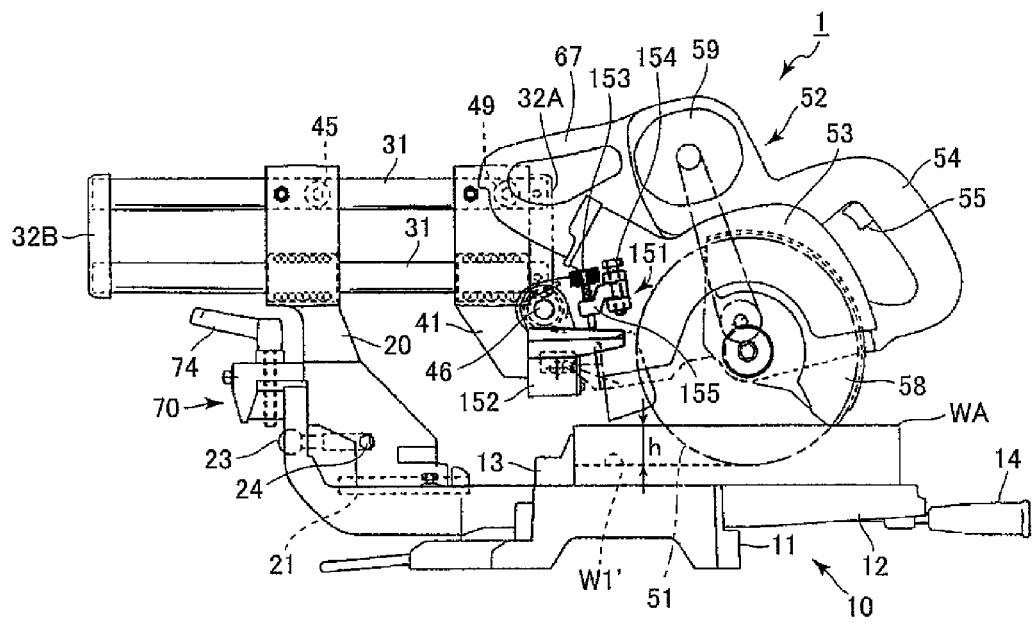
FIG. 18 is a side view of the miter saw according to a second embodiment of the present invention.

A miter saw 100 of this embodiment can provide a groove on the workpiece WA. Referring to FIG. 18, the miter saw 100 includes a stopper unit 151 mounted between the saw blade support section 40 and the saw blade section 50 for restricting the pivotal movement of the saw blade section 50 about the saw blade shaft 57.

The stopping unit 151 has a block member 152 formed integrally on the side of the support segment 41, and a knot bolt 153 provided on the side of the saw blade section 50. A support arm 155 is rotatably mounted on the saw blade section 50 about a bolt 154. The knob bolt 153 is threadingly engaged with the support arm 155 in a vertical direction. Depending on the angular position of the knob bolt 153, a tip end of the shaft of the knob bolt 153 is capable of being contact with the upper surface of the block member 152 to restrict the downward pivotal movement of the saw blade section 50.

Figure 19:
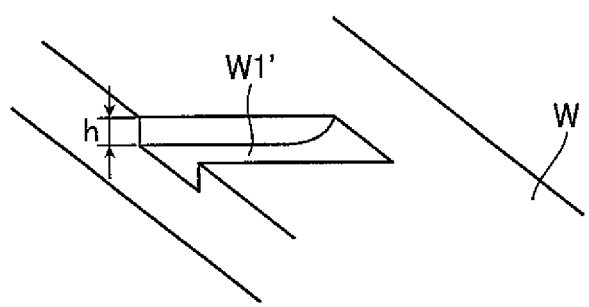
FIG. 19 is a partially perspective view showing a groove formed by the miter saw of FIG. 18.

As shown in FIG. 18, when pressing down the handle 54 to pivotably move the saw blade section 50 downward, the tip end of the shaft of the knob bolt 153 comes into contact with the upper surface of the block member 152 to prevent the saw blade section 50 from pivotably moving downward any more. Accordingly, the lowest end of the circular saw blade 51 is stopped and positioned at a predetermined height from the upper surface of the base 11. After that, when the saw blade section 50 is moved frontward along the holder 22 together with the saw blade support section 40 and the guide bar section 30 while holding the handle 54, the rotating circular saw blade 51 forms a groove W1' having a depth of "h" on the workpiece WA, as shown in FIG. 19. In this case, the pivotal amount of the saw blade section 10 (the circular saw blade 51) is adjusted by rotating the knob bolt 153 and retracting or pulling the shaft of the knob bolt 153 with respect to the support arm 155. Thus, the depth h of the groove 1' formed on the workpiece WA is adjustable.

In this embodiment, when the knob bolt 153 is retracted from the upper surface of the block member 152 and not contact therewith, different cutting is achievable including vertical cutting, angled cutting, and slant cutting, as similar to the first embodiment.

While the invention has been described in detail with reference to specific embodiments thereof, it would be apparent to those skilled in the art that various changes and modifications may be made therein without departing from the spirit and scope of the invention. For example, the numbers of the guide bars 31 is not limited to two, but one or three guide bars can be used.

Further, in the above-described embodiment, the saw blade section 50 can be pivotally moved rightward and leftward. However, a saw blade section pivotable only leftward or only rightward is also available.

Further, in the above-described embodiments, the guide bar section 30 is provided on the right side of the circular saw blade 51. However, the guide bar section can be positioned on the left side of the circular saw blade 51. Further, the turntable 12 can be dispensed with in the base section.

What is claimed is:

1. A miter saw, comprising:
    a base section having an upper surface for supporting a workpiece to be cut;
    a holder section standing from the base portion;
    a saw blade section comprising a circular saw blade for cutting the workpiece, the saw blade section being pivotally movable between an uppermost position and a lowermost position;
    a saw blade support section for pivotably supporting the saw blade section;
    a guide bar for supporting the saw blade support section, the guide bar being supported by the holder section, the guide bar extending substantially parallel to the upper surface of the base section;
    a first handle for pivoting the saw blade section, the first handle being located in an imaginary plane containing a side surface of the saw blade; and
    a second handle used for carrying the miter saw, the second handle comprising a grip portion to be gripped, the grip portion being maintained in a horizontal direction when the saw blade section is positioned at the lowermost position;
    wherein the saw blade support section is slidable along the guide bar,
    wherein the circular saw blade has a rotation shaft and the side surface, the miter saw has a width extending in a parallel direction to the rotation shaft and a length extending in a parallel direction to the side surface, the circular saw blade is positioned in a position in proximity to a center of the width, the guide bar is deviated in the width direction from the side surface by a predetermined distance, and the second handle is positioned away in the width direction from the imaginary plane in which the first handle is located, and the second handle is positioned between the circular saw blade and the guide bar in the width direction.

2. The miter saw as claimed in claim 1,
wherein the second handle is positioned in proximity to a center of the miter saw when the saw blade section is moved to a rearmost position along the guide bar.

3. The miter saw as claimed in claim 1, wherein the guide bar includes:
a first guide bar having a first longitudinal center axis; and
a second guide bar having a second longitudinal center axis, the first and second guide bars defining a plane including the first and second longitudinal axes,
wherein the plane is positioned parallel to the side surface of the circular saw blade.

4. The miter saw as claimed in claim 1,
wherein the guide bar has a length shorter than a longitudinal length of the base section.

5. The miter saw as claimed in claim 1,
wherein the guide bar is slidable with respect to the holder section.

6. The miter saw as claimed in claim 1, wherein the saw blade section further comprises a motor for rotating the circular saw blade, the second handle being positioned between the motor and the holder section in an extending direction of the guide bar.

7. A miter saw, comprising:
a base section having an upper surface for supporting a workpiece to be cut;
a holder section standing from the base portion;
a saw blade section comprising a circular saw blade for cutting the workpiece, the saw blade section being pivotally movable between an uppermost position and a lowermost position;
a saw blade support section for pivotably supporting the saw blade section;
a guide bar for slidably supporting the saw blade support section, the guide bar being supported by the holder section, the guide bar extending substantially parallel to the upper surface of the base section, and the saw blade support section being slidable along the guide bar;
a handle used for carrying the miter saw, the handle comprising a grip portion to be gripped, the grip portion being maintained in a horizontal direction when the saw blade section is positioned at the lowermost position;
wherein the circular saw blade has a rotation shaft and a side surface, the miter saw has a width extending in a parallel direction to the rotation shaft and a length extending in a parallel direction to the side surface, the circular saw blade is positioned in a position in proximity to a center of the width, the guide bar is deviated in the width direction from the side surface by a predetermined distance, and the handle is spaced in the width direction from the circular saw blade and is positioned between the circular saw blade and the guide bar in the width direction;
wherein the guide bar includes:
a first guide bar having a first longitudinal center axis; and
a second guide bar having a second longitudinal center axis, the first and second guide bars defining a plane including the first and second longitudinal axes,
wherein the plane is positioned parallel to the side surface of the circular saw blade.

8. The miter saw as claimed in claim 7, wherein the saw blade section further comprises a motor for rotating the circular saw blade, the handle being positioned between the motor and the holder section in an extending direction of the guide bar.

9. A miter saw, comprising:
a base section having an upper surface for supporting a workpiece to be cut;
a holder section standing from the base portion;
a saw blade section comprising a circular saw blade for cutting the workpiece, the saw blade section being pivotally movable between an uppermost position and a lowermost position;
a saw blade support section for pivotably supporting the saw blade section;
a guide bar for supporting the saw blade support section, the guide bar being supported by the holder section, the guide bar extending substantially parallel to the upper surface of the base section, the saw blade support section being slidable along the guide bar in order to change a relative position thereof with respect to the guide bar;
a first handle for pivoting the saw blade section; and
a second handle used for carrying the miter saw, the second handle comprising a grip portion to be gripped, the grip portion being maintained in a horizontal direction when the saw blade section is positioned at the lowermost position;
wherein the saw blade support section is slidable along the guide bar,
wherein the circular saw blade has a rotation shaft and a side surface, the miter saw has a width extending in a parallel direction to the rotation shaft and a length extending in a parallel direction to the side surface, the circular saw blade is positioned in a position in proximity to a center of the width, the guide bar is deviated in the width direction from the side surface by a predetermined distance, and the second handle is spaced in the width direction from the circular saw blade and is positioned between the circular saw blade and the guide bar in the width direction.

10. The miter saw as claimed in claim 9,
wherein the second handle is positioned in proximity to a center of the miter saw when the saw blade section is moved to a rearmost position along the guide bar.

11. The miter saw as claimed in claim 9, wherein the guide bar includes:
a first guide bar having a first longitudinal center axis; and
a second guide bar having a second longitudinal center axis, the first and second guide bars defining a plane including the first and second longitudinal axes,
wherein the plane is positioned parallel to the side surface of the circular saw blade.

12. The miter saw as claimed in claim 9,
wherein the guide bar has a length shorter than a longitudinal length of the base section.

13. The miter saw as claimed in claim 9,
wherein the guide bar is slidable with respect to the holder section.

14. The miter saw as claimed in claim 9, wherein the saw blade section further comprises a motor for rotating the circular saw blade, the second handle being positioned between the motor and the holder section in an extending direction of the guide bar.

15. A miter saw, comprising:
a base section having an upper surface for supporting a workpiece to be cut;
a holder section standing from the base portion;
a saw blade section comprising a circular saw blade for cutting the workpiece, the saw blade section being pivotally movable between an uppermost position and a lowermost position;

a saw blade support section for pivotably supporting the saw blade section;

a guide bar for slidably supporting the saw blade support section, the guide bar being supported by the holder section, the guide bar extending substantially parallel to the upper surface of the base section, and the saw blade support section being slidable along the guide bar in order to change a relative position thereof with respect to the guide bar; and a handle used for carrying the miter saw, the handle comprising a grip portion to be gripped, the grip portion being maintained in a horizontal direction when the saw blade section is positioned at the lowermost position;

wherein the circular saw blade has a rotation shaft and a side surface, the miter saw has a width extending in a parallel direction to the rotation shaft and a length extending in a parallel direction to the side surface, the circular saw blade is positioned in a position in proximity to a center of the width, the guide bar is deviated from the side surface by a predetermined distance, and the handle is spaced in the width direction from the circular saw blade and is positioned between the circular saw blade and the guide bar in the width direction.

16. The miter saw as claimed in claim 15, wherein the saw blade section further comprises a motor for rotating the circular saw blade, the handle being positioned between the motor and the holder section in an extending direction of the guide bar.

* * * * *